United States Patent
Nandy et al.

(10) Patent No.: US 11,855,792 B2
(45) Date of Patent: Dec. 26, 2023

(54) MULTICAST RENDEZVOUS POINT DEPLOYMENT IN A VIRTUAL GATEWAY OF A DISTRIBUTED TUNNEL FABRIC

(71) Applicant: Hewlett Packard Enterprise Development LP, Houston, TX (US)

(72) Inventors: Tathagata Nandy, Bangalore (IN); Subramanian Muthukumar, Bangalore (IN); Chethan Chavadibagilu Radhakrishnabhat, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 104 days.

(21) Appl. No.: 17/491,326

(22) Filed: Sep. 30, 2021

(65) Prior Publication Data

US 2023/0099633 A1 Mar. 30, 2023

(51) Int. Cl.
 *H04L 12/18* (2006.01)
 *H04L 12/66* (2006.01)
 *H04L 12/46* (2006.01)
 *H04L 45/64* (2022.01)

(52) U.S. Cl.
 CPC .......... *H04L 12/18* (2013.01); *H04L 12/4633* (2013.01); *H04L 12/66* (2013.01); *H04L 45/64* (2013.01)

(58) Field of Classification Search
 None
 See application file for complete search history.

(56) References Cited

U.S. PATENT DOCUMENTS 9,948,472 B2 * 4/2018 Drake .................. H04L 12/18

FOREIGN PATENT DOCUMENTS

JP 2010278777 A * 12/2010

* cited by examiner

*Primary Examiner* — Christine T Duong
(74) *Attorney, Agent, or Firm* — Park, Vaughan, Fleming & Dowler LLP

(57) ABSTRACT

A system for multicast traffic management in an overlay tunnel fabric is provided. The system can operate a first switch and a second switch of the fabric as part of a virtual switch. The virtual switch can operate as a gateway for the fabric. The system can efficiently deploy a rendezvous point (RP) for a multicast group at the first switch. During operation, the system can determine whether to synchronize a registration packet associated with the multicast group with the second switch based on a type of a first ingress connection associated with the registration packet. The system can then determine whether to receive subsequent registration packets for the multicast group based on the type of the first ingress connection and reception of a join request for the multicast group. The type of a respective connection indicates whether the connection includes an overlay tunnel.

20 Claims, 10 Drawing Sheets

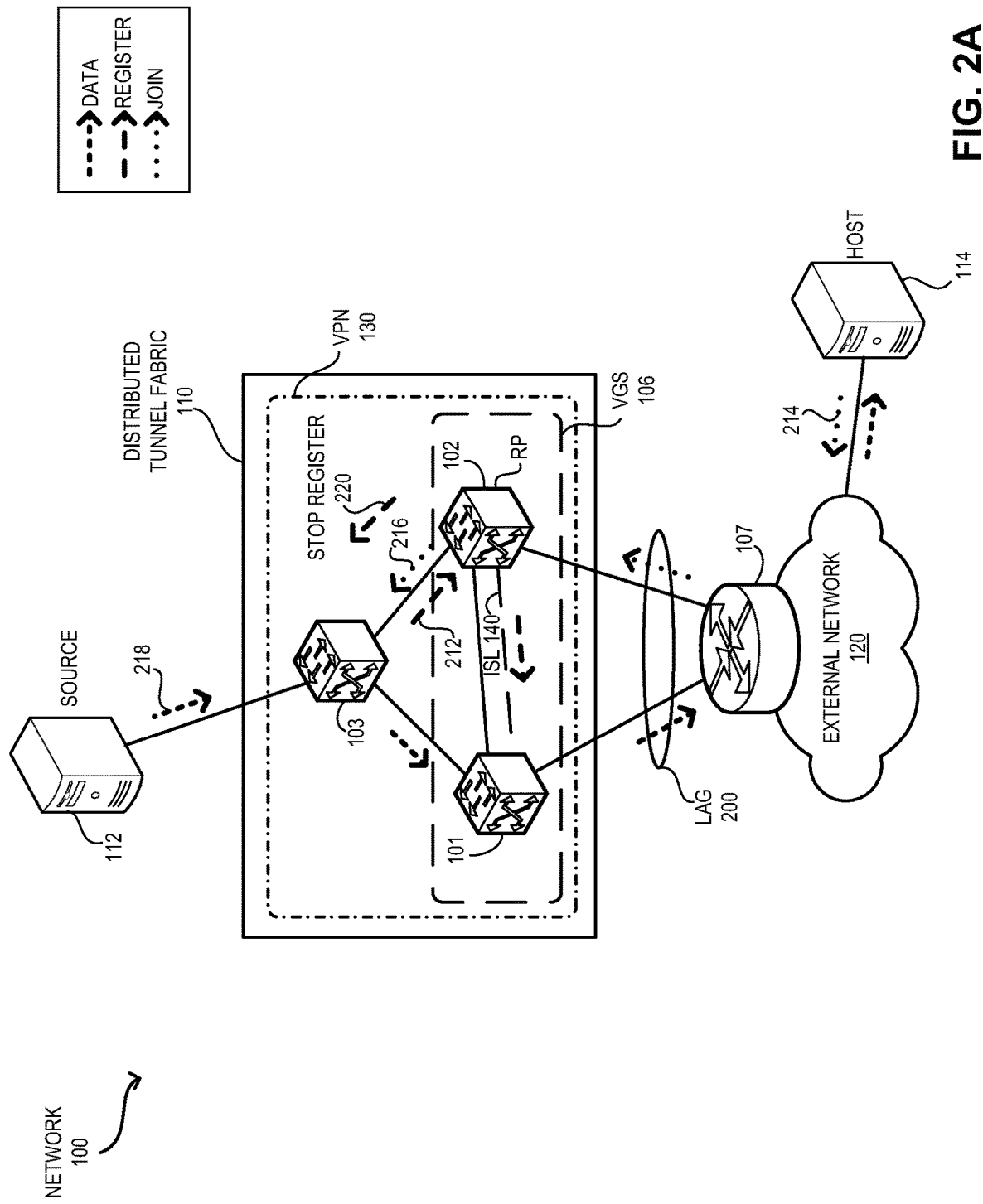

MULTICAST RENDEZVOUS POINT DEPLOYMENT IN A VIRTUAL GATEWAY OF A DISTRIBUTED TUNNEL FABRIC

BACKGROUND

Field

The present disclosure relates to communication networks. More specifically, the present disclosure relates to a method and system for facilitating an efficient deployment of a multicast rendezvous point (RP) in a virtual gateway of a distributed tunnel fabric.

BRIEF DESCRIPTION OF THE FIGURES

FIG. 2A illustrates an example of register message management in a virtual gateway of a distributed tunnel fabric, in accordance with an aspect of the present application.

In the figures, like reference numerals refer to the same figure elements.

DETAILED DESCRIPTION

Figure 1:
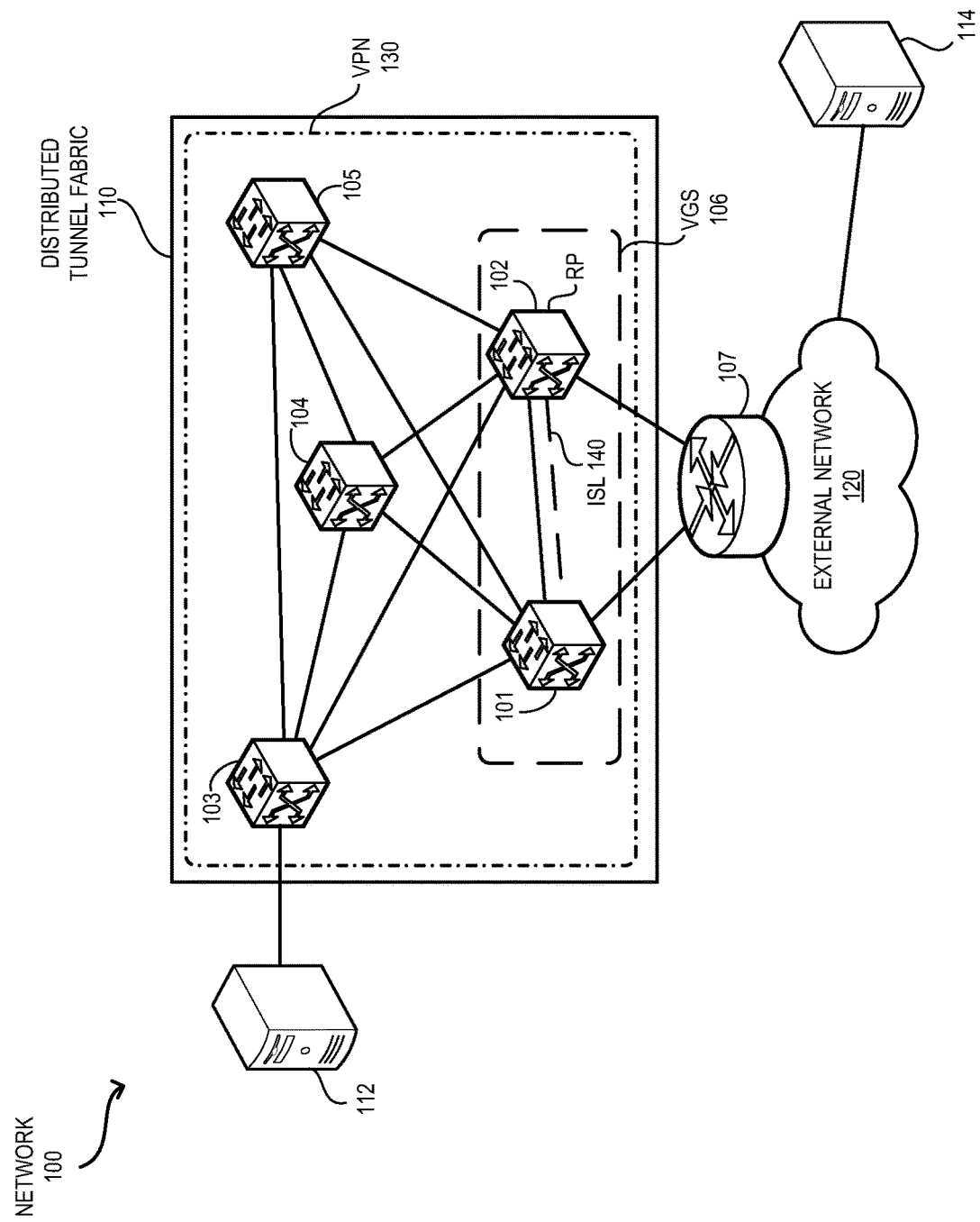
FIG. 1 illustrates an example of a distributed tunnel fabric with a virtual gateway deploying a multicast RP, in accordance with an aspect of the present application.

The following description is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the aspects shown, but is to be accorded the widest scope consistent with the claims.

Internet is the delivery medium for a variety of applications running on physical and virtual devices. Such applications have brought with them an increasing traffic demand. As a result, equipment vendors race to build switches with versatile capabilities. To do so, a switch may support different protocols and services. For example, the switch can support tunneling and virtual private networks (VPNs). The switch can then facilitate overlay routing for a VPN over the tunnels. For example, an Ethernet VPN (EVPN) can be deployed as an overlay over a set of virtual extensible local area networks (VXLANs). To deploy a VPN over the tunnels, a respective tunnel endpoint may map a respective client virtual local area network (VLAN) to a corresponding tunnel network identifier (TNI), which can identify a virtual network for a tunnel.

The TNI may appear in a tunnel header that encapsulates a packet and is used for forwarding the encapsulated packet via a tunnel. For example, if the tunnel is formed based on VXLAN, the TNI can be a virtual network identifier (VNI) of a VXLAN header, and a tunnel endpoint can be a VXLAN tunnel endpoint (VTEP). A TNI can also be mapped to the virtual routing and forwarding (VRF) associated with the tunnels if the layer-3 routing and forwarding are needed. Since a VPN can be distributed across the tunnel fabric, a VPN over the tunnel fabric can also be referred to as a distributed tunnel fabric. A gateway of the fabric can be a virtual gateway switch (VGS) shared among a plurality of participating switches. Consequently, deploying a multicast rendezvous point (RP) in the fabric can be challenging.

One aspect of the present technology can provide a system for managing multicast traffic at a first switch in an overlay tunnel fabric. The system can operate the first switch as part of a virtual switch in conjunction with a second switch of the fabric. The virtual switch can operate as a gateway for the fabric. The system can efficiently deploy a rendezvous point (RP) for a multicast group at the first switch. During operation, the system can determine whether to synchronize a registration packet associated with the multicast group with the second switch based on a type of a first ingress connection associated with the registration packet. The system can then determine whether to receive subsequent registration packets for the multicast group based on the type of the first ingress connection and reception of a join request for the multicast group. The type of a respective connection indicates whether the connection includes an overlay tunnel.

In a variation on this aspect, if the type of the first ingress connection indicates a first overlay tunnel in the overlay tunnel fabric, the system can synchronize a registration packet associated with the multicast group with the second switch.

In a variation on this aspect, the system can determine whether to receive subsequent registration packets for the multicast group by determining whether a set of conditions has been satisfied. If the set of conditions is satisfied, the system can send a stop register packet for the multicast group.

In a further variation, the set of conditions can include the type of the first ingress connection indicating a first overlay tunnel in the overlay tunnel fabric. The set of conditions can also include receiving a multicast group join request for the multicast group from a downstream device based on a first multicast protocol. The set of conditions can further include sending a multicast management join request for the multicast group to an upstream device based on a second multicast protocol.

In a variation on this aspect, the second switch can operate as an RP for a second multicast group. The system can then generate upstream states for a source-specific tree (SPT) without receiving an initial packet from the second switch.

In a further variation, the system can receive the initial packet via a second overlay tunnel in the overlay tunnel fabric. The second overlay tunnel is associated with the SPT.

In a variation on this aspect, the system can receive a data packet belonging to the multicast group and send a flow synchronization message to the second switch. The flow synchronization message can indicate that the first switch has received the data packet.

In a further variation, upon sending the flow synchronization message, the system can receive a prune request via a first virtual local area network (VLAN) from the second switch. If the prune request is received, the system can remove the first VLAN from an output list of the multicast group.

In a further variation, the system can receive a multicast management join request from the second switch via the first VLAN. The system can also receive a multicast group management join request from the second switch via a second VLAN. A requesting host of the multicast group may belong to the second VLAN. The system can then add the first and second VLANs to an output list of the multicast group.

The aspects described herein solve the problem of efficiently deploying a multicast rendezvous point (RP) for a distributed tunnel fabric by (i) configuring one of the participating switches of the VGS of the fabric as the RP for a respective multicast group; and (ii) synchronizing multicast information among the participating switches such that a respective participating switch may perform operations of the RP. By sharing multicast information among the participating switches, the multicast states can be synchronized. Consequently, a respective participating switch can participate in the registration process and create an upstream state regardless of its data reception or RP status.

The fabric can include a VGS that can couple the fabric to other networks. Typically, at least two switches can operate as a single switch in conjunction with each other to facilitate the VGS. Switches participating in the VGS can be referred to as participating switches. A respective participating switch can consider the other participating switches as peer participating switches (or peer switches). The VGS can be associated with one or more virtual addresses (e.g., a virtual Internet Protocol (IP) address and/or a virtual media access control (MAC) address). A respective tunnel formed at the VGS can use the virtual address to form the tunnel endpoint. As a result, other tunnel endpoints of the fabric can consider the VGS as the other tunnel endpoint for a tunnel instead of any of the participating switches.

To forward traffic toward the VGS, a tunnel endpoint of the fabric can perform a load balancing operation (e.g., based on hashing on a respective packet) and select one of the participating switches as the destination (i.e., as the other tunnel endpoint). The tunnel endpoint can then forward the packet via a tunnel between the tunnel endpoints. Typically, a source for a multicast group can be present outside of the fabric, whereas the client hosts can be connected to the fabric (e.g., reachable via the endpoint switches). Consequently, the hosts can reach the rest of the network (e.g., to the Internet) via the VGS.

Placement of the RP can be an essential factor in establishing multicast connectivity if the fabric deploys Protocol Independent Multicast-Sparse-Mode (PIM-SM). Since the source may register with the RP by encapsulating a data packet and sending the encapsulated packet to the RP via unicast, placing the RP far from the source can lead to overhead in the network. The encapsulation overhead can increase further for the fabric since the packet would also be encapsulated with a fabric encapsulation header. For example, if the RP is configured inside the fabric (e.g., on a leaf endpoint switch), communicating with the RP may require multiple levels of encapsulations and decapsulations.

Initially, the source can encapsulate the data packet and send the encapsulated packet to the RP. If the RP is inside the fabric, the encapsulated packet can reach the VGS, which can further encapsulate the encapsulated packet with a tunnel header. The VGS can then forward the multi-encapsulated packet to the RP. Upon receiving it, the RP can decapsulate both encapsulation headers and process the data packet. On the other hand, if the RP is present closer to the source, the join requests from the hosts may need to travel a significant distance via the fabric for forming the RP tree (RPT). The RPT can also be referred to as a (*,G) tree. Here, "G" indicates the multicast group, and "*" indicates any available source of the multicast group. Similar problems may exist if the source is reachable via the fabric and the hosts are external devices.

To solve this problem, the RP of a multicast group can be configured in one of the participating switches of the VGS. Such a switch can be referred to as an RP participating switch for the multicast group. The rest of the participating switches can be referred to as non-RP participating switches for the multicast group. Typically, the RP is the encapsulation termination point for the source, and the VGS is the encapsulation termination point for the tunnel endpoints of the fabric. Consequently, the co-located RP and VGS can consolidate the encapsulations and provide efficient deployment of the RP for the fabric. Furthermore, placing the RP on a participating switch of the VGS can facilitate RP redundancy. If the RP participating switch becomes unavailable, another participating switch can become the RP for the multicast group, thereby mitigating traffic loss.

Managing source registration at the RP participating switch can be challenging since the participating switches form the VGS, which can operate as a single logical tunnel endpoint. However, external devices may consider the participating switches as individual switches. To efficiently manage the registration process, a respective participating switch pair can maintain an inter-switch link (ISL) between them for sharing multicast control and/or data packets. An ISL can be a layer-2 or layer-3 connection that allows data forwarding between two switches. The ISL can also be based on a tunnel between the participating switch pair. A participating switch can synchronize multicast information associated with a multicast group with a respective peer participating switch via the corresponding ISL.

To facilitate the data forwarding and synchronization operations, a respective participating switch of the VGS can be configured for specific scenarios. Based on the configurations, the VGS can facilitate efficient distribution of multicast traffic to and from the fabric without requiring modifications to standard multicast protocols, such as Protocol Independent Multicast (PIM) and Internet Group Management Protocol (IGMP). During operation, an endpoint switch of the fabric can receive a multicast packet from a source of a multicast group. Since the switch can consider the VGS as a single logical switch, the switch can perform a selection operation, such as applying a hash function, for the packet to select one of the participating switches as the remote tunnel endpoint.

The switch can then encapsulate the packet in the tunnel header and forward the encapsulated packet to the selected participating switch. Since the path of the packet cannot be predetermined, the participating switches may synchronize RP-related states among each other. For example, if the packet is a multicast register message (e.g., a PIM register message) received via a tunnel from the designated router (DR) of the source, the receiving participating switch can synchronize the register message with a respective peer participating switch via the corresponding ISL. The synchronization of register messages can ensure that the registration states are the same on the participating switches.

After receiving the register message from the DR of the source, the RP participating switch can send a management join request (e.g., a PIM join request) to the source to join the source-specific tree (SPT) of the multicast group. The SPT can also be referred to as an (S,G) tree. Here, "G" indicates the multicast group, and "S" indicates the source of the multicast group. However, due to the unpredictability of packet arrival, the RP participating switch may not receive a data packet. An RP typically sends a register stop message to the DR of the source upon receiving a data packet to instruct the DR of the source to stop sending register messages. To address this problem, the RP participating switch may proactively send the register stop message to the DR of the source without receiving the data packet if a set of conditions are satisfied.

The set of conditions can include at least one of the participating switches receiving a data packet via a tunnel (e.g., based on a layer-3 TNI), the RP participating switch receiving a group join request (e.g., an IGMP join request) for the multicast group from a downstream device, and the RP participating switch sending a management join request (e.g., a PIM join request) to the source. If these conditions are satisfied, the RP participating switch can send the register stop message to the DR of the source. In this way, the VGS ensures that the DR of the source stops sending register messages to the RP even if the RP does not receive a data packet from the source.

Furthermore, the SPT for a multicast group and the initial states associated with the SPT are typically formed via the RPT. However, the data packet from the source may arrive at a non-RP participating switch based on the selection process. Since the packet has not arrived from the RP of the group, the non-RP participating switch may not create the upstream states for the SPT associated with the group. Consequently, the corresponding multicast routes may not be generated for the non-RP participating switch. As a result, the data packet may not be forwarded to the host. To address this issue, the non-RP participating switch may create the upstream states for the SPT without receiving the initial data packet via the RP if the data packet is received from a tunnel (e.g., based on a layer-3 TNI) by one of the participating switches.

Under some circumstances, the hosts requesting multicast traffic may belong to a first virtual local area network (VLAN). However, the participating switches can be configured with multiple VLANs. Upon receiving a group join request from one of the hosts, a non-RP participating switch may select a second VLAN for sending a management join request. However, since the group join requests are synchronized among the participating switches, the received join request can be sent to the RP participating switch via the first VLAN. Hence, the RP participating switch can add both VLANs to the multicast output interface list (OList). The OList can facilitate an output list for forwarding multicast trarric belonging to the multicast group.

Consequently, upon receiving data packets, the RP participating switch can forward the packets via the first VLAN toward the hosts and the second VLAN toward the non-RP participating switch, which can then forward the packet via the first VLAN. To avoid such duplication, the participating switches can synchronize the state of a respective multicast flow (e.g., the arrival of a packet). Based on the synchronization, the non-RP participating switch can request the RP participating switch to prune the second VLAN, thereby avoiding packet duplication.

In this disclosure, the term "switch" is used in a generic sense, and it can refer to any standalone or fabric switch operating in any network layer. "Switch" should not be interpreted as limiting examples of the present invention to layer-2 networks. Any device that can forward traffic to an external device or another switch can be referred to as a "switch." Any physical or virtual device (e.g., a virtual machine or switch operating on a computing device) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting examples of the present invention to layer-3 networks. "Packet" can be replaced by other terminologies referring to a group of bits, such as "message," "frame," "cell," "datagram," or "transaction." Furthermore, the term "port" can refer to the port that can receive or transmit data. "Port" can also refer to the hardware, software, and/or firmware logic that can facilitate the operations of that port.

FIG. 1 illustrates an example of a distributed tunnel fabric with a virtual gateway deploying a multicast RP, in accordance with an aspect of the present application. A network 100 can include a number of switches and devices. In some examples, network 100 can be an Ethernet, InfiniBand, or other networks, and may use a corresponding communication protocol, such as Internet Protocol (IP), FibreChannel over Ethernet (FCoE), or other protocol. Network 100 can include a distributed tunnel fabric 110 comprising switches 101, 102, 103, 104, and 105. Switches 101 and 102 of fabric 110 can be coupled to a core switch 106. Fabric 110 can be coupled to an external network 120 via switch 106.

In FIG. 1, a respective link in fabric 110 can be a tunnel. Switches of fabric 110 may form a mesh of tunnels. Examples of a tunnel can include, but are not limited to, VXLAN, Generic Routing Encapsulation (GRE), Network Virtualization using GRE (NVGRE), Generic Networking Virtualization Encapsulation (Geneve), Internet Protocol Security (IPsec). A VPN 130, such as an EVPN, can be deployed over fabric 110. Fabric 110 can include a VGS 106 that can couple fabric 110 to an external network 120. Here, switches 101 and 102 can operate as a single switch in conjunction with each other to facilitate VGS 106. VGS 106 can be associated with one or more virtual addresses (e.g., a virtual IP address and/or a virtual MAC address). A respective tunnel formed at VGS 106 can use the virtual address to form the tunnel endpoint.

As a result, other tunnel endpoints, such as switches 103, 104, and 105, of fabric 110 can consider VGS 106 as the other tunnel endpoint for a tunnel instead of switches 101 and 102. To forward traffic toward VGS 106, a switch in fabric 110, such as switch 105, can perform a load balancing operation and select one of switches 101 and 102 as the destination (i.e., the other tunnel endpoint). On the other hand, an external switch 107 (e.g., a layer-3 router supporting PIM) can be coupled to VGS 106. Suppose that device 114, which can be coupled to fabric 110 via switch 107, forwards traffic to device 112 coupled to switch 103 of fabric 110. Here, each of devices 112 and 114 can be any device capable of requesting and receiving data from a multicast group.

Here, device 114 can be a source for a multicast group, and device 112 can be a multicast client host. Consequently, device 112 can be reached device 114 (e.g., using the Internet) via VGS 106. Placement of the RP can be an essential factor in establishing multicast connectivity if fabric 110 deploys PIM-SM. Since device 114 may register with the RP by encapsulating a data packet and sending the encapsulated packet to the RP via unicast, placing the RP far from device 114 can lead to overhead in network 100. The encapsulation overhead can further increase for fabric 110 since the packet would further be encapsulated with a fabric encapsulation header in fabric 110. For example, if the RP is configured inside fabric 110 (e.g., on switch 104), communicating with the RP may require multiple levels of encapsulations and decapsulations.

Initially, device 114 can encapsulate the data packet and send the encapsulated packet to the RP. If the RP is configured on switch 104, the encapsulated packet can reach VGS 106, which can further encapsulate the encapsulated packet with a tunnel header. VGS 106 can then forward the multi-encapsulated packet to switch 104. Upon receiving it, switch 104 can decapsulate both encapsulation headers and process the data packet. On the other hand, if the RP is present closer to device 114, such as on switch 107, the join requests from device 112 may need to travel a significant distance via fabric 110 for forming the RPT. Similar problems may exist if the source is device 112 and the client host is device 114.

To solve this problem, the RP of a multicast group can be configured in one of the participating switches of VGS 106. For example, for a particular multicast group, switch 102 can be configured as the RP. Hence, switch 102 can be referred to as the RP participating switch for the multicast group. Switch 101 can then be referred to as the non-RP participating switch for the multicast group. It should be noted that, for another multicast group, switch 101 may operate as the RP. If device 112 is the source of the multicast group, switch 102 can be the encapsulation termination point for device 112. Furthermore, VGS 106 can be the encapsulation termination point for switches 103, 104, and 105. Consequently, the co-located RP and VGS in switch 102 can consolidate the encapsulations and provide efficient deployment of the RP for fabric 110. Furthermore, placing the RP on switch 102 can facilitate RP redundancy. If switch 102 becomes unavailable, switch 101 can become the RP for the multicast group, thereby mitigating traffic loss.

Managing source registration at switch 102 can be challenging since VGS 106 may operate as a single logical tunnel endpoint for switches 103, 104, and 105. However, switch 107 may consider switches 101 and 102 as individual switches. To efficiently manage the registration process, switches 101 and 102 can maintain an ISL 140 between them for sharing multicast control and/or data packets. ISL 140 can be a layer-2 or layer-3 connection that allows data forwarding between switches 101 and 102. ISL 140 can also be based on a tunnel between switches 101 and 102 (e.g., a VXLAN tunnel). In this way, switches 101 and 102 can synchronize multicast information associated with the multicast group via ISL 140.

Because multiple switches 101 and 102 may participate in VGS 106, which switch may receive control and data packets of a multicast group is uncertain. However, standard multicast protocols, such as PIM and IGMP, are designed to operate with an RP on a single switch. To facilitate efficient distribution of multicast traffic to and from fabric 110 without requiring modifications to standard multicast protocols, VGS 106 may need to execute certain operations based on data reception and synchronization. Both switches 101 and 102 can be configured for executing the operations even though the RP is deployed on switch 102. For example, switches 101 and 102 can synchronize a multicast register packet received from a tunnel with each other via ISL 140. The synchronization of register packets can ensure that the registration states are the same on switches 101 and 102.

Furthermore, if packet 101 receives a packet belonging to a multicast group via a tunnel, and switch 102 participates in the multicast group (e.g., sends and receives join requests), switch 102 may proactively send a register stop packet to the DR of the source without receiving a data packet of the group. In this way, switch 102 ensures the DR of the source does not continue to send register packets. In addition, switch 101 may create the upstream states for the SPT of the group without receiving the initial data packet via switch 102 if the data packet is received from a tunnel by switch 101 or 102. Moreover, switches 101 and 102 can synchronize the state of a respective multicast flow (e.g., the arrival of a packet). Based on the synchronization, switch 101 can request switch 102 to prune the VLAN corresponding to RPT, thereby avoiding packet duplication over SPT and RPT.

FIG. 2A illustrates an example of register message management in a virtual gateway of a distributed tunnel fabric, in accordance with an aspect of the present application. In this example, device 112 can be the source of data for a multicast group, and device 114 can be a requesting host for the multicast group. Hence, switch 103 can be the DR for device 112. Device 114 can be coupled to switch 107, which can be coupled to fabric 110 via a link aggregation group (LAG) 200. Consequently, switch 107 can be coupled to switches 101 and 102, and the coupling links can be aggregated based on a link aggregation protocol, such as the Link Aggregation Control Protocol (LACP). In some embodiments, LAG 200 can be a multicast LAG.

Since the path of a message from switch 103 cannot be predetermined, participating switches may synchronize RP-related states among each other. During operation, switch 103, operating as the DR for source device 112, can send a register message 212 (e.g., a PIM register message) a tunnel to switch 102. Upon receiving register message 212, switch 102 can synchronize register message 212 with switch 101 via ISL 140. The synchronization of register message 212 can ensure that the registration states are the same on switches 101 and 102. Host device 114 can send a group join request 214 (e.g., an IGMP join request) via LAG 200. Subsequently, switch 102 may receive join request 214.

After receiving register message 212 from switch 103, switch 102 can send a management join request 216 (e.g., a PIM join request) to device 112 to join the SPT of the multicast group. Accordingly, device 112 can send a data packet 118, which is received by switch 103. However, due to the unpredictability of path selection at switch 103, packet 118 can be forwarded to switch 101. Consequently, even though switch 102 is the RP, switch 102 may not receive packet 118. However, switch 102 operating as an RP may send a register stop packet to switch 103 (e.g., the DR of the source) upon receiving packet 118 to instruct switch 103 to stop sending register messages.

To address this problem, switch 103 may proactively send register stop message 220 to switch 103 without receiving packet 118 if a set of conditions are satisfied. The set of conditions can include at least one of switches 101 and 102 receiving packet 118 via a tunnel (e.g., based on a layer-3 TNI) from switch 103, switch 102 receiving group join request 114 for the multicast group from host device 114, and switch 102 sending management join request 116. Since these conditions are satisfied, switch 102 can send register stop message 220 to switch 103. In this way, VGS 106 ensures that the DR of source device 112, which is switch 103, stops sending register packets to switch 102 even if switch 102 does not receive packet 118.

Figure 2B:
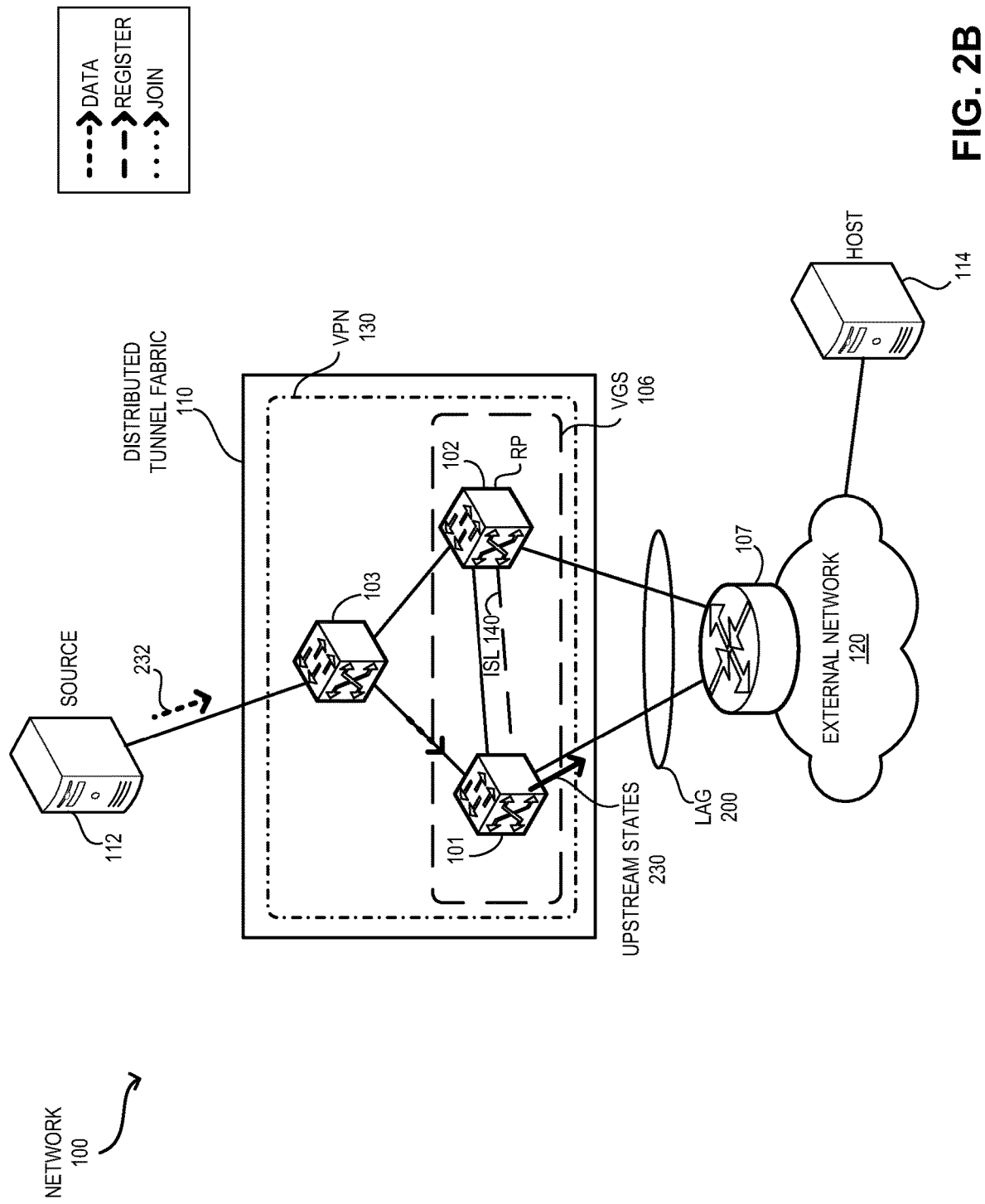
FIG. 2B illustrates an example of multicast upstream state management in a virtual gateway of a distributed tunnel fabric, in accordance with an aspect of the present application.

FIG. 2B illustrates an example of multicast upstream state management in a virtual gateway of a distributed tunnel fabric, in accordance with an aspect of the present application. Typically, the SPT from source device 112 and the initial states associated with the SPT are formed via the RPT at switch 102. Upon formation of the SPT, source device 112 may send a data packet 232 via the SPT. However, packet 232 may arrive at switch 101 based on the selection process at switch 103. Since packet 232 has not arrived from the RP, which is switch 102, switch 101 may not create the upstream states for the SPT associated with the group.

Consequently, the corresponding multicast routes may not be generated for switch 101. As a result, packet 232 may not be forwarded to host device 114. To address this issue, switch 101 may create upstream states 230 for the SPT without receiving packet 232 via switch 102 if packet 232 is received from a tunnel (e.g., based on a layer-3 TNI) by VGS 106. This allows switch 101 to be aware of the packet received at VGS 106 and create upstream states 230 for the SPT without receiving the packet via switch 102, which can be the RP of the multicast group.

Figure 3:
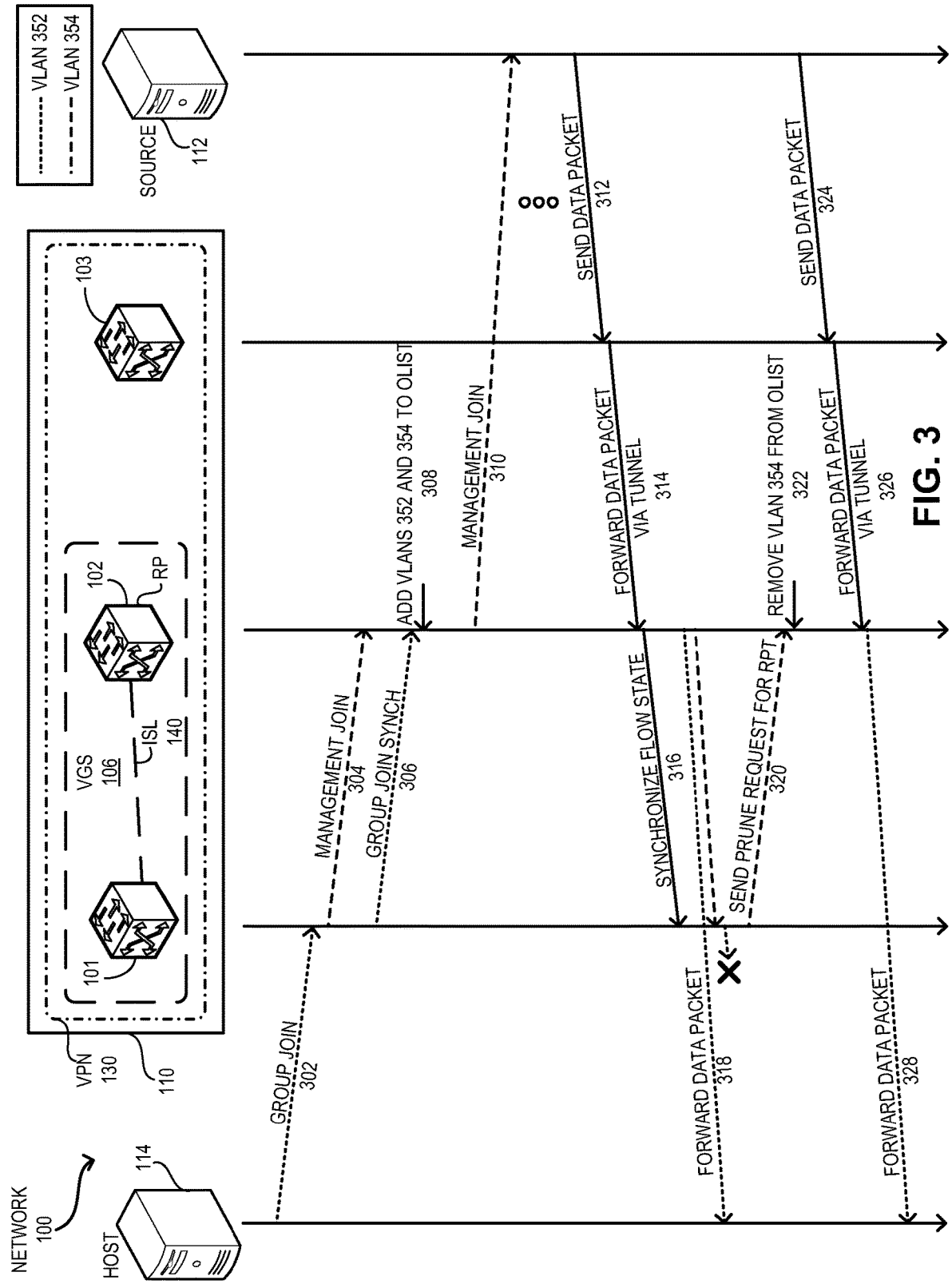
FIG. 3 illustrates an example of flow state synchronization in a virtual gateway of a distributed tunnel fabric, in accordance with an aspect of the present application.

FIG. 3 illustrates an example of flow state synchronization in a virtual gateway of a distributed tunnel fabric, in accordance with an aspect of the present application. In this example, device 114 can be a requesting host (i.e., a multicast client) of a multicast group, and device 112 can be the source of the multicast group. Switch 102 can be the RP for the multicast group. Device 114 may belong to a VLAN 352. Switches 101 and 102 can be configured with multiple VLANs 352 and 354. During operation, switch 101 may receive a group join request from host device 114 (operation 302). Since switch 102 is the RP, switch 101 may select VLAN 304 for sending a management join request to switch 102 (operation 304), thereby joining the RPT. However, since the group join requests are synchronized between switches 101 and 102, the group join request can be sent to switch 102 via VLAN 352 (operation 306).

Consequently, switch 102 can add both VLANs 352 and 354 to OList of the multicast group. Switch 102 can join the SPT for the multicast group by sending a management join request (operation 310), as described in conjunction with FIG. 2A. Source device 112 can send a data packet via the SPT (operation 312). The DR of source device 112, switch 103, can forward the packet via a tunnel (e.g., using a layer-3 TNI) to switch 102 (operation 314). Switch 102 can forward the packet via VLAN 352 toward host device 114 (operation 318) based on the OList. However, since VLAN 354 is also present in the OList, switch 102 may also forward the packet via VLAN 354 toward switch 101. However, since switch 101 has received a group join message via VLAN 352, switch 101 can forward the packet via VLAN 352. As a result, host device 114 may receive duplicate copies of the packet.

Typically, the arrival of a packet via an SPT can cause switch 101 to prune the RPT. However, switch 101 may not receive the packet via the SPT since switch 103 may select switch 102 as the destination for the packet received via the SPT. As a result, switch 101 may not prune the RPT and continue to receive packets via VLAN 354 and forward the packets via VLAN 352. To avoid such duplication (denoted with a cross), switches 101 and 102 can synchronize the state of a respective multicast flow (e.g., the arrival of a packet). For example, switch 102 can synchronize the flow state with switch 101 (operation 316). Switch 102 may send a notification message to switch 101 indicating that a packet via the SPT has been received at switch 102.

Based on the synchronization, switch 101 can send a prune request for the RPT via VLAN 354 (operation 320). Upon receiving the prune request, switch 102 can remote VLAN 354 from the OList (operation 322). Source device 112 can then send a subsequent data packet via the SPT (operation 324). Switch 103 can forward the packet via a tunnel to switch 102 (operation 326). Switch 102 can forward the packet via VLAN 352 toward host device 114 (operation 328) based on the OList. Since VLAN 354 is removed from the OList, switch 102 can refrain from forwarding the packet via VLAN 354 toward switch 101, thereby avoiding packet duplication.

Figure 4A:
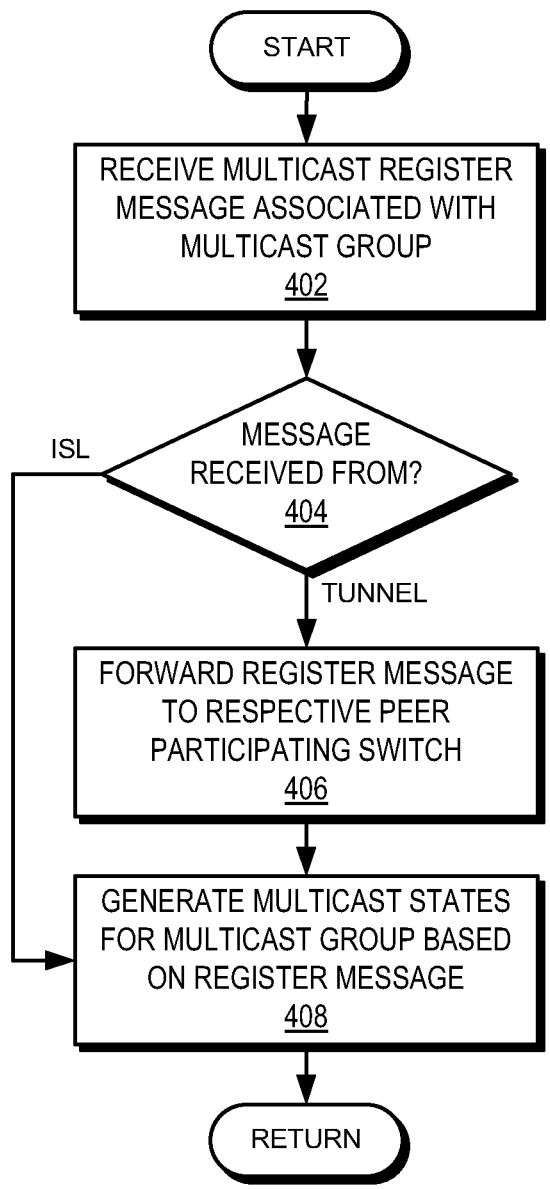
FIG. 4A presents a flowchart illustrating the process of a participating switch of a virtual gateway switch (VGS) synchronizing a register message with peer participating switches, in accordance with an aspect of the present application.

FIG. 4A presents a flowchart illustrating the process of a participating switch of a VGS synchronizing a register message with peer participating switches, in accordance with an aspect of the present application. During operation, the switch can receive a multicast register message associated with a multicast group (operation 402). The switch can then determine where the register message is received from (e.g., the type of ingress connection for the register message) (operation 404). If the register message is received from a tunnel, the switch can forward the register message to a respective peer participating switch (operation 406). If the register message is received from the ISL (operation 404) or upon forwarding the register message (operation 406), the switch can generate the multicast states for the multicast group based on the register message (operation 408).

Figure 4B:
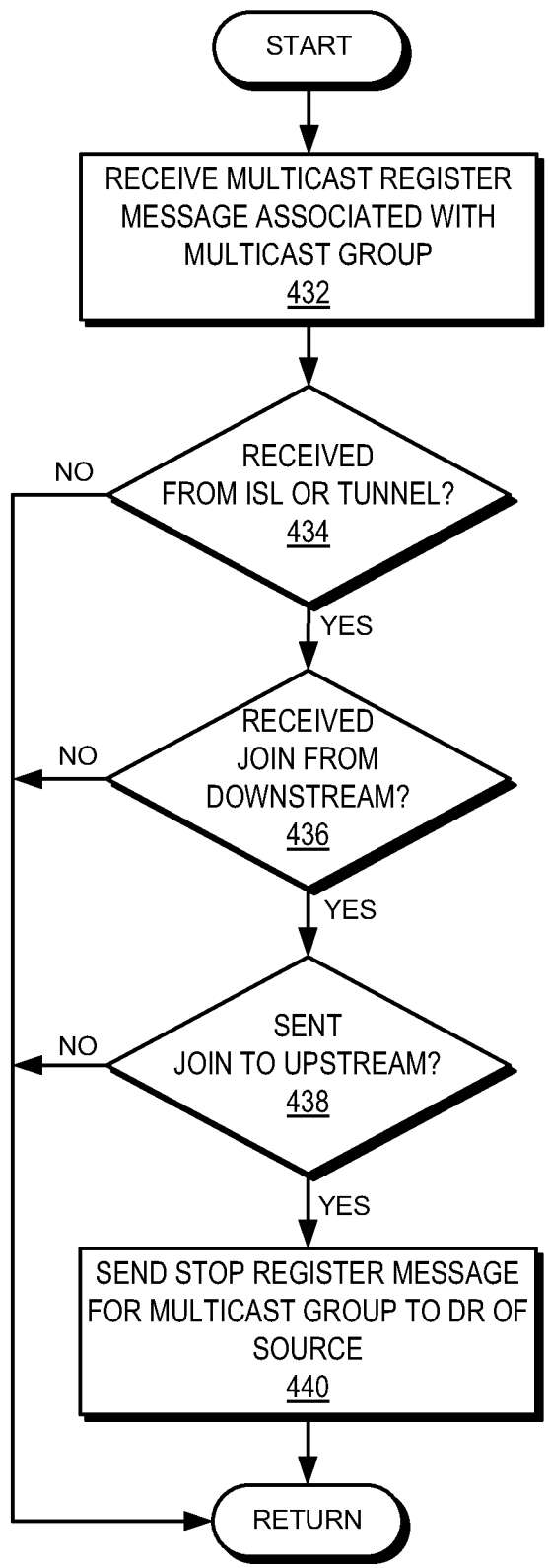
FIG. 4B presents a flowchart illustrating the process of a participating switch of a VGS issuing a register stop message, in accordance with an aspect of the present application.

FIG. 4B presents a flowchart illustrating the process of a participating switch of a VGS issuing a register stop message, in accordance with an aspect of the present application. During operation, the switch can receive a multicast register message associated with a multicast group (operation 432). The switch can determine where the register message is received from (operation 434). If the register message is received from the ISL or a tunnel, the switch can determine whether the switch has received a join request (e.g., an IGMP join request) from a downstream device (operation 436). If the switch has received a join request from a downstream device, the switch can also determine whether the switch has sent a join request (e.g., a PIM join request) to an upstream device (operation 438). If the switch has sent a join request, the switch can send a stop register message for the multicast group to the DR of the source (operation 440).

Figure 4C:
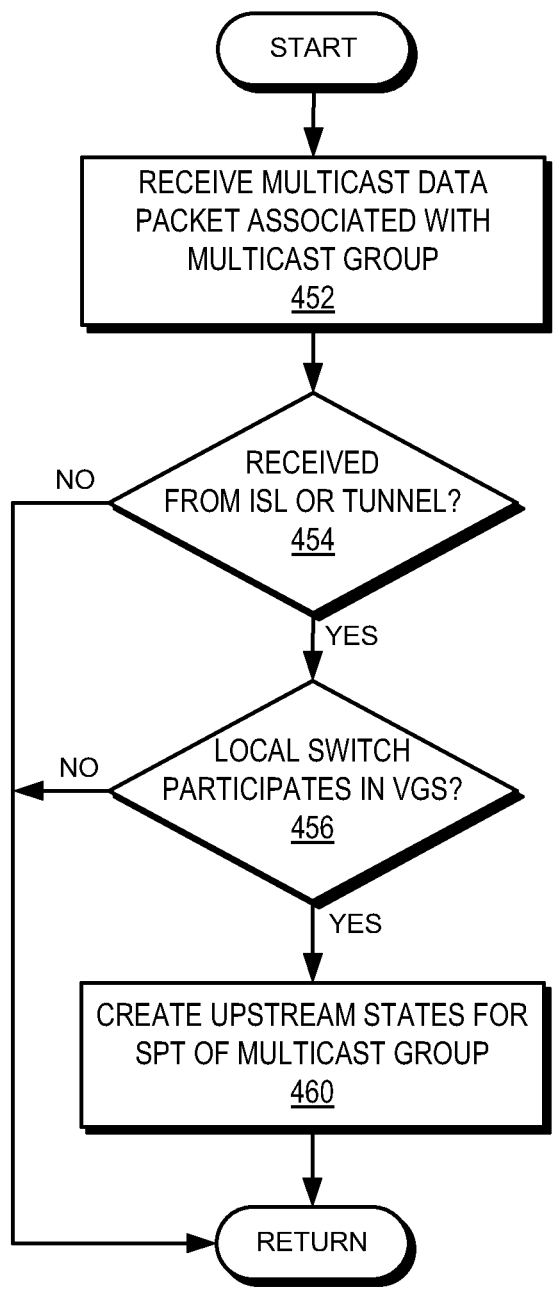
FIG. 4C presents a flowchart illustrating the process of a participating switch of a VGS creating an upstream state, in accordance with an aspect of the present application.

FIG. 4C presents a flowchart illustrating the process of a participating switch of a VGS creating an upstream state, in accordance with an aspect of the present application. During operation, the switch can receive a multicast data packet associated with a multicast group (operation 452). The switch can determine where the data packet is received from (operation 454). If the register message is received from the ISL or a tunnel, the switch can determine whether the local switch participates in the VGS (operation 456). If the local switch participates in the VGS, the switch can create the upstream states for the SPT of the multicast group (operation 460).

Figure 5A:
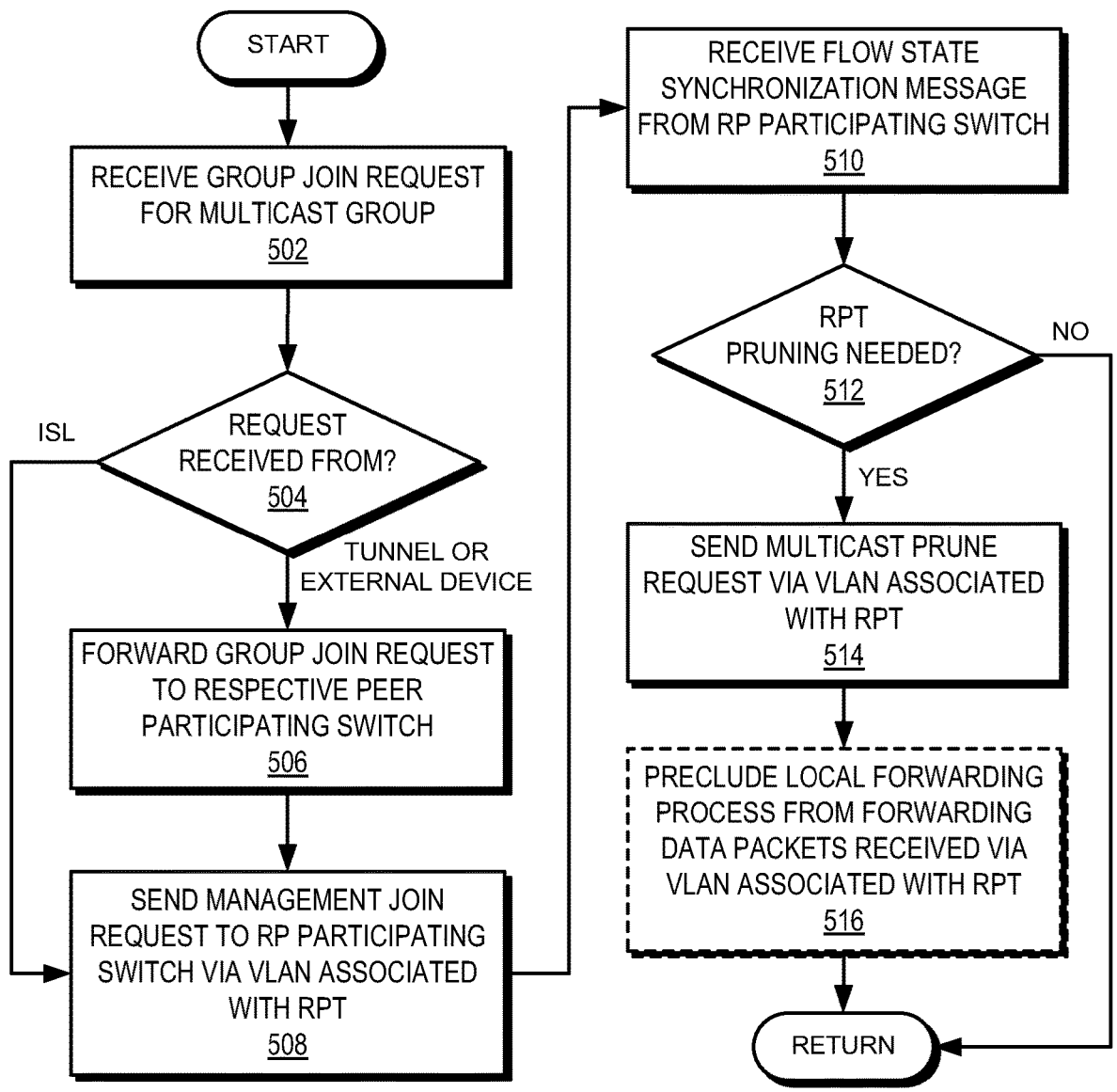
FIG. 5A presents a flowchart illustrating the process of a participating switch of a VGS issuing a prune request based on flow state synchronization, in accordance with an aspect of the present application.

FIG. 5A presents a flowchart illustrating the process of a participating switch of a VGS issuing a prune request based on flow state synchronization, in accordance with an aspect of the present application. During operation, the switch can receive a group join request (e.g., an IGMP request) for a multicast group (operation 502). The switch can determine where the group join request is received from (operation 504). If the group join request is received from a tunnel or an external device, the switch can forward the group join request to a respective peer participating switch (operation 506). If the group join request is received from the ISL (operation 504) or upon forwarding the group join request (operation 506), the switch can send a management join request (e.g., a PIM join request) to the RP participating switch via the VLAN associated with the RPT (operation 508).

The switch can then receive a flow state synchronization message from the RP participating switch (operation 510). The switch can determine whether the RPT pruning is needed (operation 512). For example, the switch can determine that the RP participating switch has joined the SPT based on a packet received from the source of the multicast group. The switch can then determine that an RPT pruning is needed. Accordingly, the switch can send a multicast prune request (e.g., a PIM join/prune message) via the VLAN associated with the RPT (operation 514). The switch can, operationally (denoted with dashed lines), preclude the local forwarding process from forwarding data packets received via the VLAN associated with the RPT, if any (operation 516).

Figure 5B:
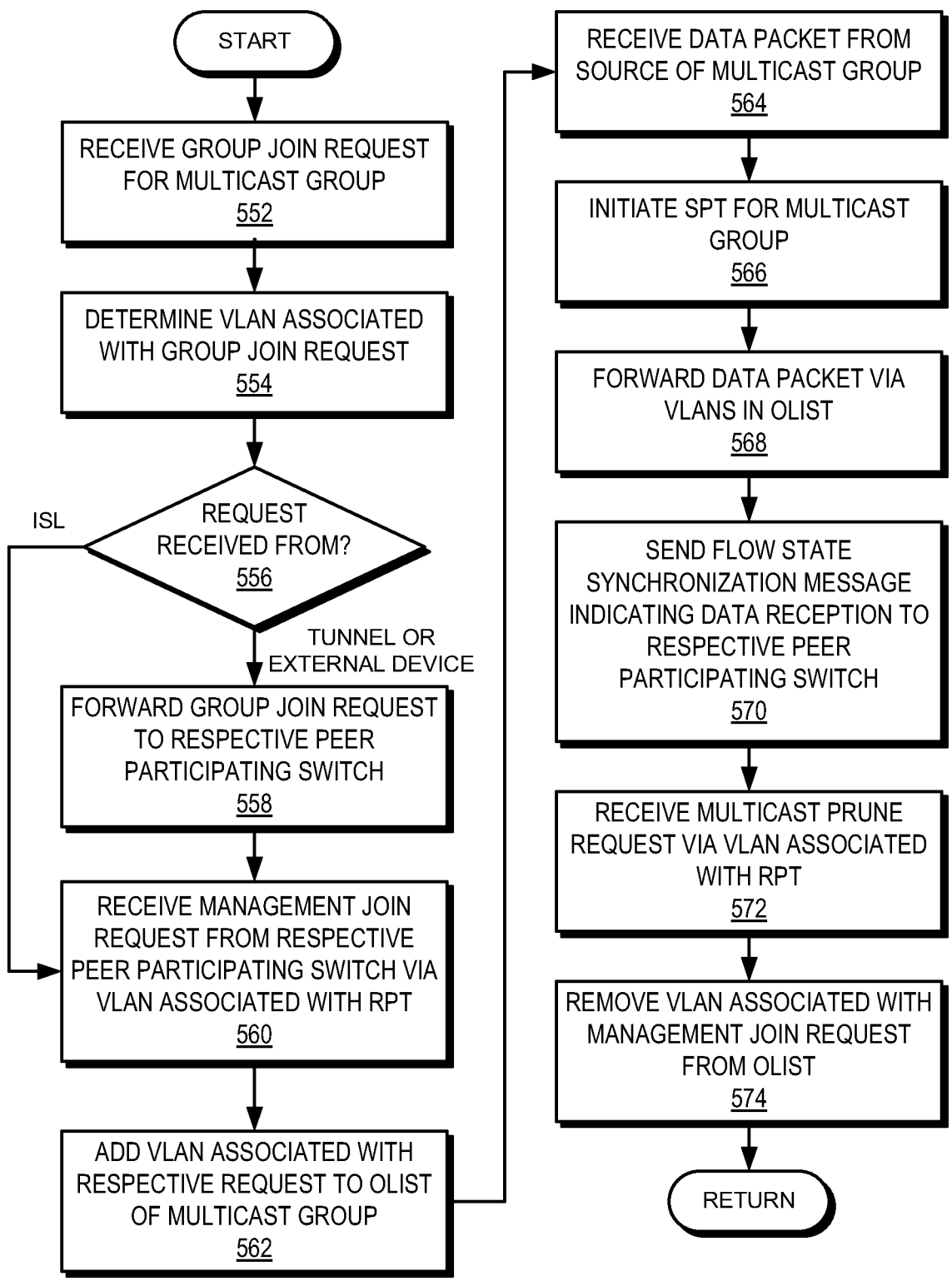
FIG. 5B presents a flowchart illustrating the process of a participating switch of a VGS synchronizing flow states with peer participating switches, in accordance with an aspect of the present application.

FIG. 5B presents a flowchart illustrating the process of a participating switch of a VGS synchronizing flow states with peer participating switches, in accordance with an aspect of the present application. During operation, the switch can receive a group join request for a multicast group (operation 552). The switch can then determine the VLAN associated with the group join request (e.g., the VLAN via which the request is revived) (operation 554). Subsequently, the switch can determine where the group join request is received from (operation 556). If the group join request is received from a tunnel or an external device, the switch can forward the group join request to a respective peer participating switch (operation 558).

If the group join request is received from the ISL (operation 556) or upon forwarding the group join request (operation 558), the switch can receive a management join request from the RP participating switch via the VLAN associated with the RPT (operation 508). The switch can then add the VLAN associated with a respective request to the OList of the multicast group (operation 562). The switch can receive a data packet from the source of the multicast group (e.g., via a tunnel) (operation 564) and initiate an SPT for the multicast group (operation 566). The switch can then forward the data packet via the VLANs in the OList (operation 568).

The switch can also send a flow state synchronization message indicating the data reception to a respective peer participating switch (operation 570). The flow state synchronization message can indicate whether the RPT pruning is needed. For example, receiving the packet can indicate that the RP participating switch has joined the SPT since the packet is received from the source of the multicast group. Accordingly, the switch can receive a multicast prune request via the VLAN associated with the RPT (operation 572). The switch can then remove the VLAN associated with the management join request from the OList (operation 574).

Figure 6:
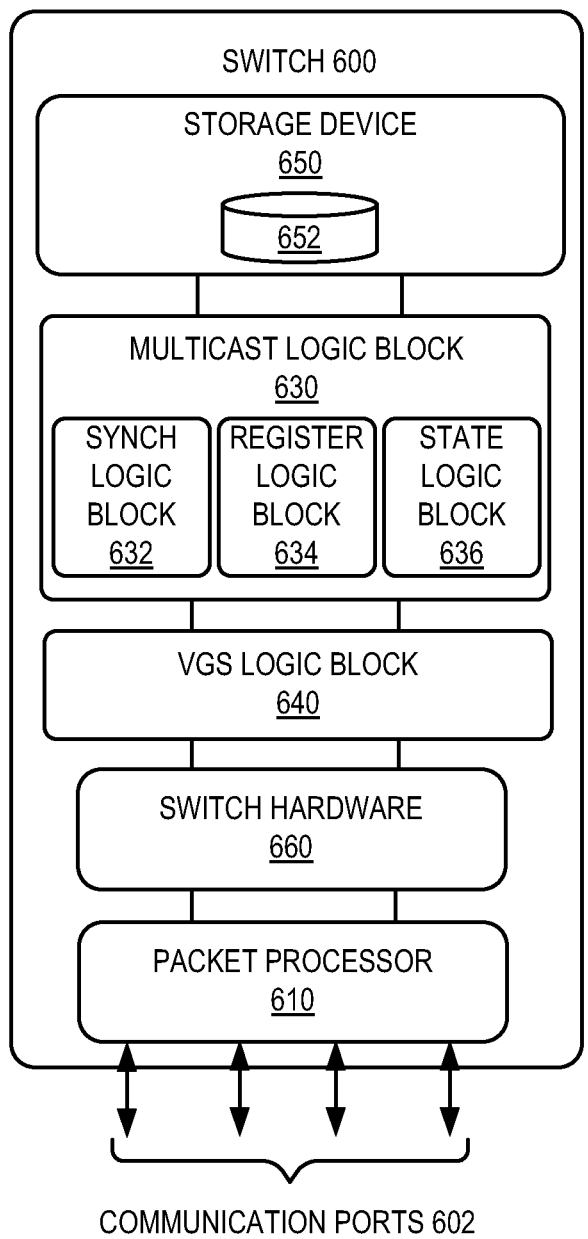
FIG. 6 illustrates an exemplary switch facilitating a virtual gateway supporting an efficient deployment of an RP in a distributed tunnel fabric, in accordance with an aspect of the present application.

FIG. 6 illustrates an exemplary switch facilitating a virtual gateway supporting an efficient deployment of an RP in a distributed tunnel fabric, in accordance with an aspect of the present application. In this example, a switch 600 includes a number of communication ports 602, a packet processor 610, and a storage device 650. Switch 600 can also include switch hardware 660 (e.g., processing hardware of switch 600, such as its application-specific integrated circuit (ASIC) chips), which includes information based on which switch 600 processes packets (e.g., determines output ports for packets). Packet processor 610 extracts and processes header information from the received packets. Packet processor 610 can identify a switch identifier (e.g., a MAC address and/or an IP address) associated with switch 600 in the header of a packet.

Communication ports 602 can include inter-switch communication channels for communication with other switches and/or user devices. The communication channels can be implemented via a regular communication port and based on any open or proprietary format. Communication ports 602 can include one or more Ethernet ports capable of receiving frames encapsulated in an Ethernet header. Communication ports 602 can also include one or more IP ports capable of receiving IP packets. An IP port is capable of receiving an IP packet and can be configured with an IP address. Packet processor 610 can process Ethernet frames and/or IP packets. A respective port of communication ports 602 may operate as an ingress port and/or an egress port.

Switch 600 can maintain a database 652 (e.g., in storage device 650). Database 652 can be a relational database and may run on one or more DBMS instances. Database 652 can store information associated with a respective multicast group, tunnel, EVPN, RP information, and interface associated with switch 600. Switch 600 can include a VGS logic block 640. VGS logic block 640 can allows switch 600 to operate as a VGS, such as VGS 106, in a tunnel fabric. To do so, VGS logic block 640 may operate in conjunction with another switch.

Switch 600 can include a multicast logic block 630, which can include a synchronization logic block 632, a register logic block 634, and a state logic block 636. Multicast logic block 630 can operate switch 600 as an RP for a multicast group. Synchronization logic block 632 can synchronize a register message among a respective participating switch of the VGS. Synchronization logic block 632 can also issue flow state synchronization message upon receiving a data packet and an RPT prune request if needed. Register logic block 634 can issue a register stop message to the DR of the source of a multicast group if a corresponding set of conditions are satisfied. State logic block 636 can generate upstream states for an SPT of a multicast group even if an initial data packet is not received from an RP of the multicast group if a corresponding set of conditions are satisfied.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method comprising:
   operating a first switch as a part of a virtual switch in conjunction with a second switch, and wherein the virtual switch is to operate as a gateway for an overlay tunnel fabric that includes the first and second switches;
   operating, at the first switch, a rendezvous point (RP) for a multicast group;
   determining, by the first switch, whether to synchronize a registration packet associated with the multicast group with the second switch based on a type of a first ingress connection via which the registration packet is received at the first switch;
   in response to the type of the first ingress connection indicating an overlay tunnel, synchronizing the registration packet with the second switch; and
   determining whether to receive subsequent registration packets for the multicast group based on the type of the first ingress connection and reception of a join request for the multicast group from a host, wherein a type of a respective connection indicates whether the connection includes an overlay tunnel of the overlay tunnel fabric.

2. The method of claim 1, further comprising, in response to the type of the first ingress connection indicating an inter-switch link coupling the second switch, generating local states associated with the multicast group based on the registration packet.

3. The method of claim 1, wherein determining whether to receive subsequent registration packets for the multicast group comprises determining whether a set of conditions has been satisfied; and
   wherein the method further comprises sending a stop register packet for the multicast group in response to the set of conditions being satisfied.

4. The method of claim 3, wherein the set of conditions includes:
   the type of the first ingress connection indicating a first overlay tunnel in the overlay tunnel fabric;
   receiving a multicast group join request for the multicast group from a downstream device based on a first multicast protocol; and
   sending a multicast management join request for the multicast group to an upstream device based on a second multicast protocol.

5. The method of claim 1, wherein the second switch operates as an RP for a second multicast group;
   wherein the method further comprises generating upstream states for a source-specific tree (SPT) without receiving an initial packet from the second switch.

6. The method of claim 5, further comprising receiving the initial packet via a second overlay tunnel in the overlay tunnel fabric, wherein the second overlay tunnel is associated with the SPT.

7. The method of claim 1, further comprising:
   receiving a data packet belonging to the multicast group; and
   sending a flow synchronization message to the second switch, wherein the flow synchronization message indicates that the first switch has received the data packet.

8. The method of claim 7, further comprising:
   in response to sending the flow synchronization message, receiving a prune request via a first virtual local area network (VLAN) from the second switch; and
   in response to receiving the prune request, removing the first VLAN from an output list of the multicast group.

9. The method of claim 7, further comprising:
   receiving a multicast management join request from the second switch via the first VLAN;
   receiving a multicast group management join request from the second switch via a second VLAN, wherein a requesting host of the multicast group belongs to the second VLAN; and
   adding the first and second VLANs to an output list of the multicast group.

10. A non-transitory computer-readable storage medium storing instructions that when executed by a computer cause the computer to perform a method, the method comprising:
    operating a first switch as part of a virtual switch in conjunction with a second switch, wherein the virtual switch is to operate as a gateway for an overlay tunnel fabric that includes the first and second switches;
    operating, at the first switch, a rendezvous point (RP) for a multicast group;
    determining, at the first switch, whether to synchronize a registration packet associated with the multicast group with the second switch based on a type of a first ingress connection via which the registration packet is received at the first switch;
    in response to the type of the first ingress connection indicating an overlay tunnel, synchronizing the registration packet with the second switch; and
    determining whether to receive subsequent registration packets for the multicast group based on the type of the first ingress connection and reception of a join request for the multicast group from a host, wherein a type of a respective connection indicates whether the connection includes an overlay tunnel of the overlay tunnel fabric.

11. The non-transitory computer-readable storage medium of claim 10, wherein the method further comprises, in response to the type of the first ingress connection indicating an inter-switch link coupling the second switch, generating local states associated with the multicast group based on the registration packet.

12. The non-transitory computer-readable storage medium of claim 10, wherein determining whether to receive subsequent registration packets for the multicast group comprises determining whether a set of conditions has been satisfied; and wherein the method further comprises sending a stop register packet for the multicast group in response to the set of conditions being satisfied.

13. The non-transitory computer-readable storage medium of claim 12, wherein the set of conditions includes:

the type of the first ingress connection indicating a first overlay tunnel in the overlay tunnel fabric;

receiving a multicast group join request for the multicast group from a downstream device based on a first multicast protocol; and sending a multicast management join request for the multicast group to an upstream device based on a second multicast protocol.

14. The non-transitory computer-readable storage medium of claim 10, wherein the second switch operates as an RP for a second multicast group;

wherein the method further comprises generating upstream states for a source-specific tree (SPT) without receiving an initial packet from the second switch.

15. The non-transitory computer-readable storage medium of claim 14, wherein the method further comprises receiving the initial packet via a second overlay tunnel in the overlay tunnel fabric, wherein the second overlay tunnel is associated with the SPT.

16. The non-transitory computer-readable storage medium of claim 10, wherein the method further comprises:

receiving a data packet belonging to the multicast group; and sending a flow synchronization message to the second switch, wherein the flow synchronization message indicates that the first switch has received the data packet.

17. The non-transitory computer-readable storage medium of claim 16, wherein the method further comprises:

in response to sending the flow synchronization message, receiving a prune request via a first virtual local area network (VLAN) from the second switch; and in response to receiving the prune request, removing the first VLAN from an output list of the multicast group.

18. The non-transitory computer-readable storage medium of claim 16, wherein the method further comprises:

receiving a multicast management join request from the second switch via the first VLAN;

receiving a multicast group management join request from the second switch via a second VLAN, wherein a requesting host of the multicast group belongs to the second VLAN; and adding the first and second VLANs to an output list of the multicast group.

19. A computer system, comprising:

a processor;

a memory device;

control circuitry to facilitate a virtual switch logic block, a multicast logic block, a synchronization logic block, and a register logic block;

wherein the virtual switch logic block is to operate, the computer system, as part of a virtual switch in conjunction with a second computer system, wherein the virtual switch is to operate as a gateway for an overlay tunnel fabric that includes the first and second computer systems;

wherein the multicast logic block is to operate the first computer system as a rendezvous point (RP) for a multicast group;

wherein the synchronization logic block is to:

determine whether to synchronize a registration packet associated with the multicast group with the second computer system based on a type of a first ingress connection via which the registration packet is received at the computer system;

in response to the type of the first ingress connection indicating an overlay tunnel, synchronize the registration packet with the second computer system; and wherein the register logic block is to determine whether to receive subsequent registration packets for the multicast group based on the type of the first ingress connection and reception of a join request for the multicast group from a host, wherein a type of a respective connection indicates whether the connection includes an overlay tunnel of the overlay tunnel fabric.

20. The computer system of claim 19, further comprising a packet processor to receive a data packet belonging to the multicast group; and wherein the synchronization logic block is further to send a flow synchronization message to the second computer system, wherein the flow synchronization message indicates that the computer system has received the data packet.

* * * * *